(12) United States Patent
Sun et al.

(10) Patent No.: US 7,748,883 B2
(45) Date of Patent: Jul. 6, 2010

(54) MOUNTING APPARATUS FOR LIGHT GUIDE PIPE

(75) Inventors: Ke Sun, Shenzhen (CN); Zhen-Xing Ye, Shenzhen (CN); Ming-Ke Chen, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 245 days.

(21) Appl. No.: 11/955,408

(22) Filed: Dec. 13, 2007

(65) Prior Publication Data

US 2008/0278959 A1     Nov. 13, 2008

(30) Foreign Application Priority Data

May 11, 2007   (CN) .................... 2007 1 0200603

(51) Int. Cl.
*F21V 17/00*     (2006.01)

(52) U.S. Cl. .................... 362/581; 362/551; 248/65; 385/65; 385/66

(58) Field of Classification Search ............... 362/551, 362/555, 26, 581, 396, 429–430, 558, 571, 362/565, 402, 391; 361/807, 810, 679.33–679.39; 385/53, 60, 65, 77, 78, 83, 84, 66, 134, 135, 385/136, 137, 138; 248/65
See application file for complete search history.

(56) References Cited

U.S. PATENT DOCUMENTS

| | | | | |
|---|---|---|---|---|
| 5,912,799 A | * | 6/1999 | Grouell et al. | 361/679.32 |
| 6,064,569 A | * | 5/2000 | Sands et al. | 361/679.32 |
| 6,152,608 A | * | 11/2000 | Ghara et al. | 385/60 |
| 6,517,254 B1 | * | 2/2003 | Hata et al. | 385/69 |
| 6,550,978 B2 | * | 4/2003 | De Marchi | 385/60 |
| 6,883,949 B2 | * | 4/2005 | Goto et al. | 362/551 |
| 7,025,507 B2 | * | 4/2006 | de Marchi | 385/66 |

* cited by examiner

*Primary Examiner*—Jong-Suk (James) Lee
*Assistant Examiner*—Robert J May
(74) *Attorney, Agent, or Firm*—Frank R. Niranjan

(57) ABSTRACT

An exemplary mounting apparatus is for adjustably fixing a light guide pipe in a chassis of an electronic device. The chassis includes a mounting plate. The mounting apparatus includes a first sleeve engaging with the light guide pipe, a second sleeve attached to the mounting plate, and a resilient member disposed between the first sleeve and the second sleeve.

13 Claims, 3 Drawing Sheets

MOUNTING APPARATUS FOR LIGHT GUIDE PIPE

BACKGROUND

1. Field of the Invention

The present invention relates to mounting apparatus for a light guide pipe, and particularly to a mounting apparatus for adjustably fixing a light guide pipe in a chassis of an electronic device.

2. Description of Related Art

Computer housings typically have viewable status indicators thereon for indicating operations therein, that emit light from internal light emitting diodes by way of coupling with a light guide pipe. Conventional light guide pipes, used in the computer housing, are securely installed during the assembly processing. However, in this conventional arrangement, once installed, it is difficult to adjust the position of the light guide pipe. When the size of the light guide pipe is not within the allowable installation tolerance due to manufacture error, the light guide pipe cannot provide adequate coupling between the indicator and the LED.

What is desired, therefore, is a mounting apparatus which can adjustably mount a light guide pipe in a chassis of an electronic device.

SUMMARY

An exemplary mounting apparatus is for adjustably fixing a light guide pipe in a chassis of an electronic device. The chassis includes a mounting plate. The mounting apparatus includes a first sleeve engaging with the light guide pipe, a second sleeve attached to the mounting plate, and a resilient member disposed between the first sleeve and the second sleeve.

Other advantages and novel features will become more apparent from the following detailed description when taken in conjunction with the accompanying drawings, in which:

DETAILED DESCRIPTION OF THE EMBODIMENT

Figure 1:
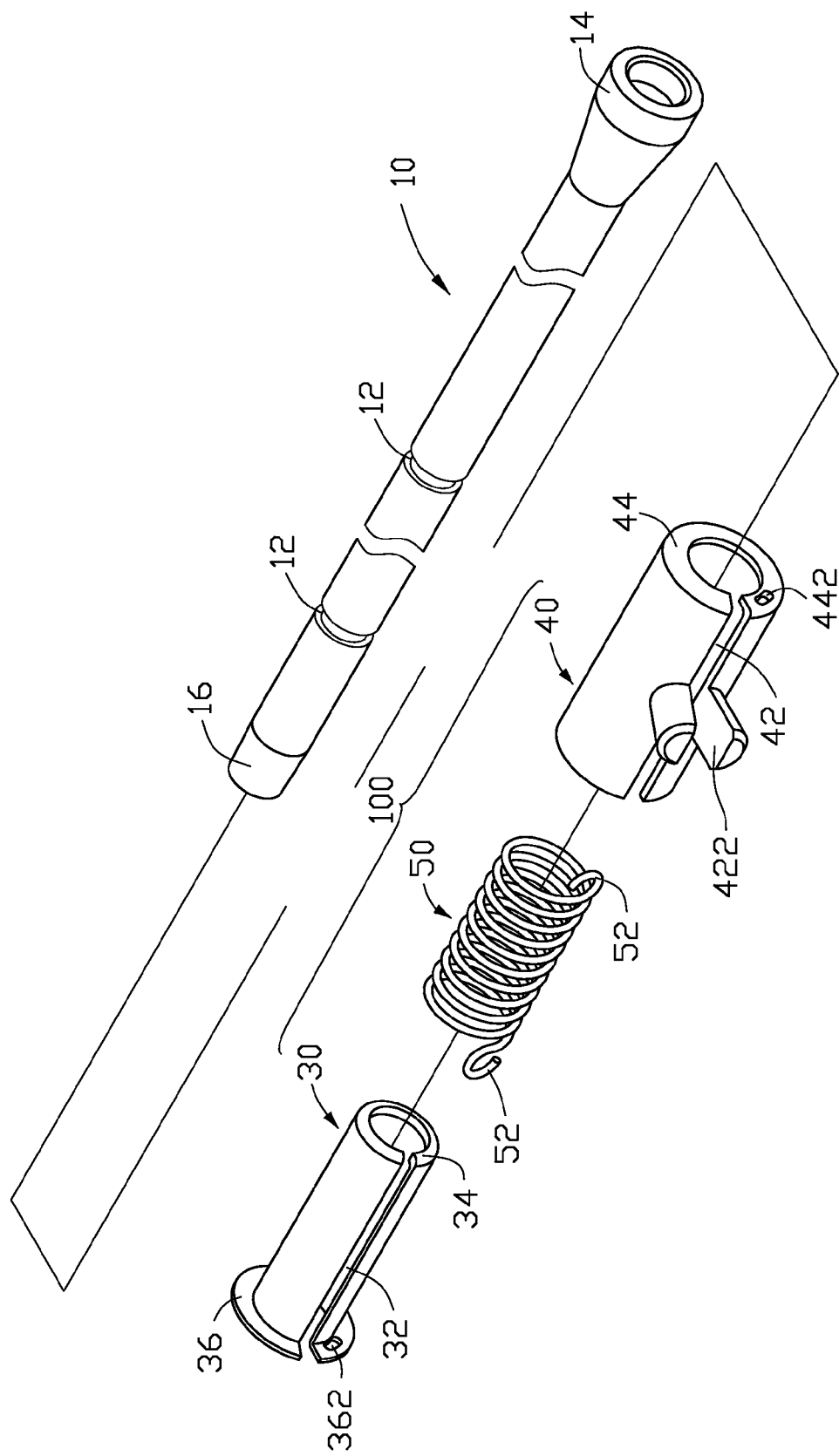
FIG. 1 is an exploded, isometric view of a light guide pipe of an embodiment of the present invention.
Figure 3:
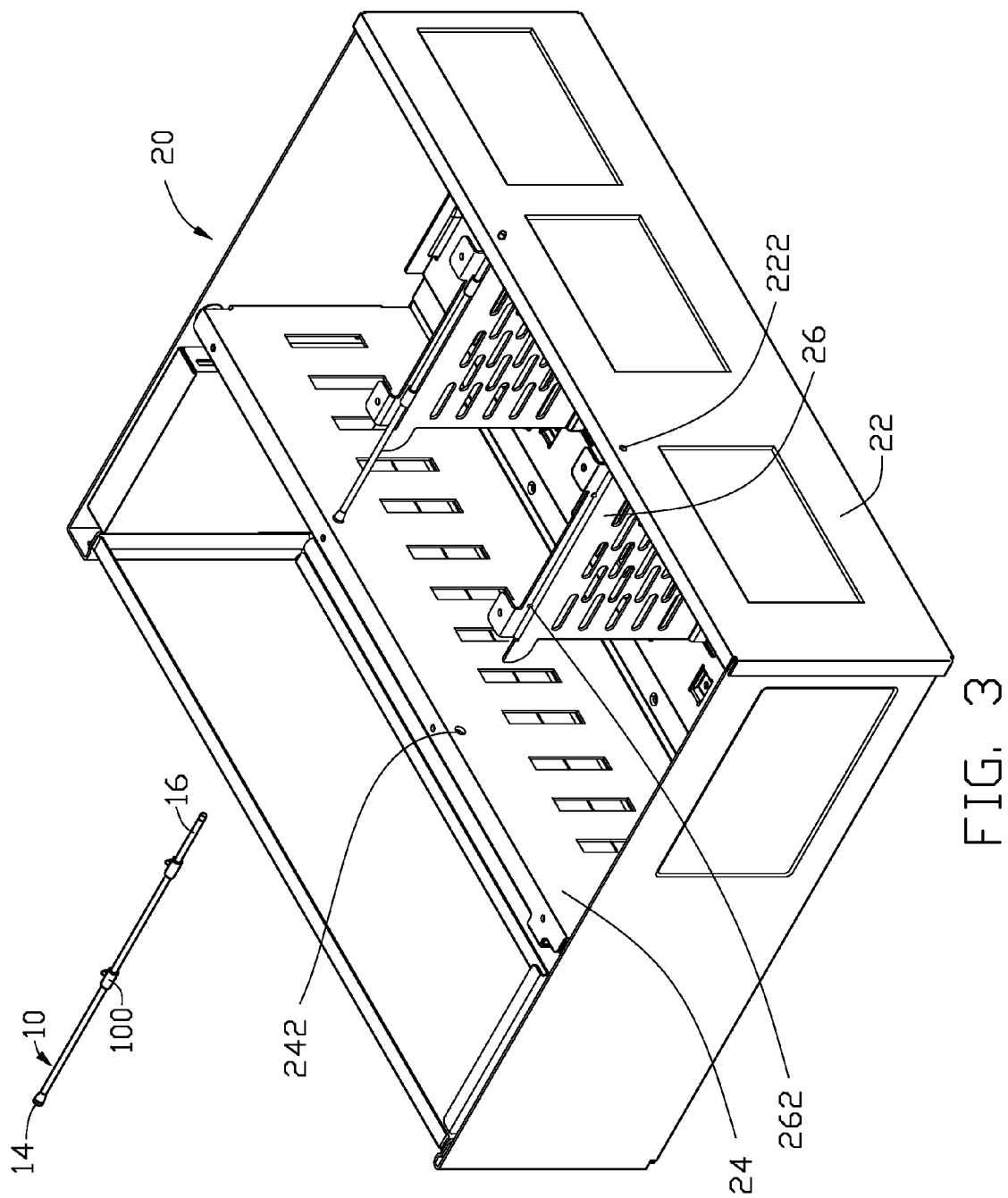
FIG. 3 is an exploded, isometric of FIG. 1 of the light guide pipe and a chassis of an electronic device.

Referring to FIGS. 1 and 3, a plurality of mounting apparatuses 100 in accordance with an embodiment of the present invention is for adjustably installing a plurality of light guide pipes 10 in a chassis 20 of an electronic device, such as a server or a personal computer. In the figures only two mounting apparatuses 100 and two light guide pipes 10 are shown and only one described herein. Each of the mounting apparatuses 100 includes a first sleeve 30, a second sleeve 40, and a resilient member 50 disposed between the first sleeve 30 and the second sleeve 40.

The chassis 20 includes a front panel 22, a middle plate 24 parallel to the front panel 22, and a plurality of mounting plates 26 perpendicularly disposed between the front panel 22 and the middle plate 24. A plurality of indicators 242 is disposed at the middle plate 24, such as LEDs, to indicate working status of the electronic device. A plurality of through holes 222 is defined in the front panel 22, corresponding to the indicators 242 of the middle plate 24. The mounting plate 26 includes a plurality of mounting holes 262 defined therein.

The light guide pipe 10 is elongated and includes a first end 14 with a large diameter, a second end 16 with a small diameter, and a plurality of annular grooves 12 defined in a circumferential outside wall thereof. The first end 14 transfers light from one of the indicators 242 of the middle plate 24 through the light guide pipe 10 to the second end 16, for providing a visual indication to the outside.

Figure 2:
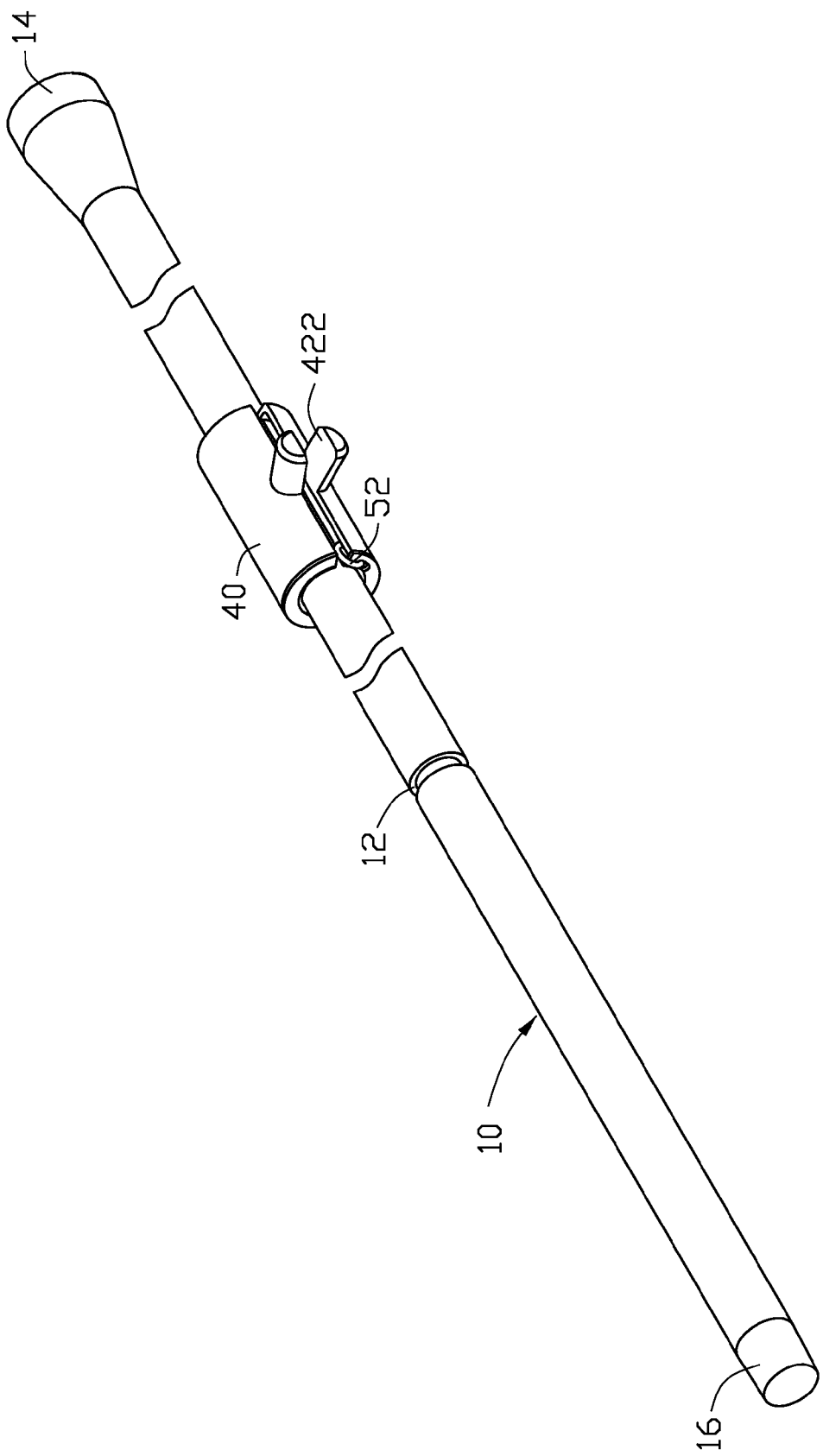
FIG. 2 is an assembled view of FIG. 1.

Referring to FIG. 2, the first sleeve 30 includes a first inside flange 34 extending inward from one end thereof, an outside flange 36 extending outward from the other end thereof, and an elongated first slot 32 defined therein and extending from the first inside flange 34 to the outside flange 36. The first slot 32 allows the first sleeve 30 to be deformable. A first fixing hole 362 is defined in the outside flange 36.

The second sleeve 40 includes a second inside flange 44 extending inward from one end thereof. An elongated second slot 42 is defined in the second sleeve 40 and extends through the second inside flange 44. A second fixing hole 442 is defined in the second inside flange 44. A pair of semi-cylindrical bars 422 extends from the circumferential wall thereof and beside the second slot 442, one opposite to the other. The second slot 42 allows the second sleeve 40 to be deformable.

The resilient member 50 is a coil spring with two hooks 52 formed at two opposite ends thereof.

Referring to FIG. 2, in assembly, the resilient member 50 is placed around the first sleeve 30, with one hook 52 thereof engaging in the first fixing holes 362 of the outside flange 36 of the first sleeve 30. The second sleeve 40 is placed around the resilient member 50, with the other hook 52 of the resilient member 50 engaging in the second fixing hole 442 of the second inside flange 44 thereof. Thus, the mounting apparatus 100 is obtained. Then, the mounting apparatus 100 is attached to the light guide pipe 10, with the first inside flange 34 of the first sleeve 30 engaging in one of the annular grooves 12 of the light guide pipe 10.

The light guide pipe 10 is mounted in the chassis 20. The first end 14 of the light guide pipe 10 is in alignment with the indicator 242 of the middle plate 24. The second end 16 of the light guide pipe 10 extends in the through holes 222 of the front panel 22. The bars 422 of the second sleeve 40 of the mounting apparatus 100 engage in the corresponding mounting hole 262 of the mounting plate 26.

The second sleeve 40 of the mounting apparatus 100 is fixedly secured to the mounting plate 26 of the chassis 20. The first sleeve 30 engages with the light guide pipe 10. The resilient member 50 is disposed between the first sleeve 30 and the second sleeve 40 so that the light guide pipe 10 is movable. When a distance between the middle plate 24 and the front panel 22 of the chassis 20 is beyond an allowable tolerance, the light guide pipe 10 is movable to adjust for the out of tolerance distance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting apparatus adjustably attaching a light guide pipe in a chassis of an electronic device, the light guide pipe comprising an annular groove defined in a circumferential wall thereof, the chassis comprising a mounting plate, the mounting apparatus comprising:

a first sleeve with one end engaging in the annular groove of the light guide pipe;

a second sleeve securely attached to the mounting plate of the chassis; and a resilient member disposed between the other end of the first sleeve and one end of the second sleeve.

2. The mounting apparatus as claimed in claim 1, wherein the first sleeve comprises a first inside flange extending inward from one end thereof, and an outside flange extending outward from the other end thereof, the first inside flange engages in the annular groove of the light guide pipe.

3. The mounting apparatus as claimed in claim 2, wherein a slot is defined in the first sleeve, extending from the first inside flange to the outside flange.

4. The mounting apparatus as claimed in claim 2, wherein the second sleeve comprises a slot defined therein along a direction of an axis thereof.

5. The mounting apparatus as claimed in claim 4, wherein a pair of bars extends from the second sleeve beside the slot to engage with the mounting plate of the chassis.

6. The mounting apparatus as claimed in claim 2, wherein the second sleeve comprises a second inside flange formed at one end thereof, the resilient member is a coil spring placed around the first sleeve, the second sleeve is placed around the coil spring, the coil spring comprises a pair of hooks formed at two ends thereof, the second inside flange of the second sleeve and the outside flange of the first sleeve each comprise a fixing hole defined therein to respectively engage with the hooks of the coil spring.

7. An electronic device comprising:

a chassis comprising a front panel, a middle plate parallel to the front panel, and a mounting plate disposed between the front panel and the middle plate;

a light guide pipe comprising a first end in alignment with an indicator of the middle plate, and a second end in alignment with a hole of the front panel; and a mounting apparatus comprising a first sleeve sleeving and engaging with the light guide pipe, and a second sleeve attached to the mounting plate and surrounding the first sleeve, the first sleeve movable relative to the second sleeve along a direction along an axis of the light guide pipe to allow the light guide pipe to be adjustable with movement between the middle plate and the front panel.

8. The electronic device as claimed in claim 7, wherein a resilient member is disposed between the first sleeve and the second sleeve.

9. The electronic device as claimed in claim 7, wherein the resilient member is a coil spring placed around the first sleeve, the coil spring comprises two hooks formed at two opposite ends thereof and respectively engaging in holes of flanges formed at ends of the first sleeve and the second sleeve.

10. The electronic device as claimed in claim 7, wherein the light guide pipe comprises an annular groove defined in a circumferential wall thereof, the first sleeve comprises a flange extending inward from one end thereof to engage in the annular groove.

11. The electronic device as claimed in claim 7, wherein a slot is defined in a circumferential wall of the first sleeve along a direction of an axis of the first sleeve.

12. The electronic device as claimed in claim 7, wherein a slot is defined in a circumferential wall of the second sleeve in a direction of an axis of the second sleeve.

13. The electronic device as claimed in claim 12, wherein a pair of bars extends outward from the circumferential wall of the second sleeve beside the slot, the mounting plate comprises a mounting hole to engage with the pair of bars.

* * * * *